Nov. 10, 1953  R. SHERR  2,659,078

MOVING OBJECT PULSE ECHO DETECTION SYSTEM

Filed Oct. 26, 1945

INVENTOR.
RUBBY SHERR
BY
William D. Hall
ATTORNEY.

Patented Nov. 10, 1953

2,659,078

UNITED STATES PATENT OFFICE 2,659,078

MOVING OBJECT PULSE ECHO DETECTION SYSTEM

Rubby Sherr, Santa Fe, N. Mex., assignor, by mesne assignments, to the United States of America as represented by the Secretary of War Application October 26, 1945, Serial No. 624,906

5 Claims. (Cl. 343—7.7)

The present invention relates to an airborne radio object locating system, and it relates more particularly to such a system which is adapted to detect moving objects.

The airborne radio object locating system contemplated herein is adapted to transmit short duration high carrier frequency exploratory pulses of radiant energy. This radiant energy is in a large measure directed toward the ground by means of a directional antenna which can be rotated about its axis both in azimuth and in elevation. The directional characteristics of the antenna are such that the major portion of the radiant energy is included in a narrow (in azimuth) beam which for all practical purposes may be considered as having a finite angular width. By adjusting the elevation angle (tilt) of the antenna, the amount or area of ground ahead of the aircraft energized by the beam may be predetermined. In a similar manner, by adjusting the azimuthal angle of the antenna, an area dead ahead or to either side of the line of travel of the aircraft may be energized by the radiant energy.

In present methods of employing radio object locating systems of this character, moving vehicles on the ground are not readily detected, as the echoes from moving objects are not readily distinguished from those returning from other objects.

It is therefore an object of the present invention to provide a simple and reliable airborne radio object locating system whereby moving vehicles, such as tanks or motor convoys, may be readily detected from the air.

It is still a further object of the present invention to provide in an airborne radio object locating system, a method for distinguishing moving objects from fixed objects.

It is another object of the present invention to provide a novel apparatus whereby distinctive aural indication is given for moving objects.

The invention, however, will be more fully understood from the following detailed description when taken into consideration with the accompanying drawing, wherein.

Figure 1:
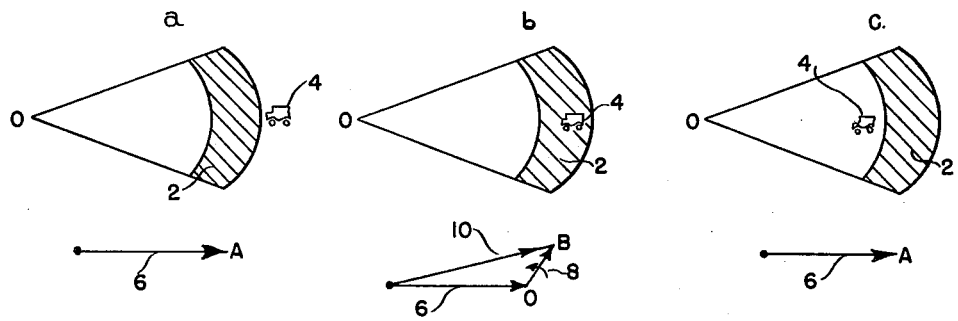
Fig. 1 illustrates certain principles of the present invention.

It was heretofore mentioned that in an airborne radio object locating system, the radiant energy is contained in a highly directional beam, said beam being considered as having a finite angular width. It is therefore evident that if a series of exploratory pulses of radiant energy is transmitted from the aircraft and directed towards the ground, a patch of ground is "energized" by the radiant energy contained in each pulse. The reflected energy returning to the aircraft from this patch of ground thus actually consists of components of energy from a large number of scattering elements contained within the patch. As each of these energy components has both magnitude and phase, each may be represented by a vector. Each component is not necessarily in phase and therefore the actual signal received at the aircraft may be represented by a vector equal to the vector sum of all the energy components reflected by the patch of ground. It is to be understood that the term "energy vector" as here used refers to a vector representing the magnitude and phase of energy from a particular point.

In all "pulse type" radio object locating systems there is a definite phase relationship between each transmitted exploratory pulse and its corresponding echo pulse. For example, if the distance between a radio object locating system and a reflecting object is fixed, then there is a fixed phase relationship between the energy contained in succeeding pulses reflected by this object and the respective exploratory pulses. If, however, the distance between the radio object locating system and a reflecting object is changing, the phase of the energy from the reflected object, likewise changes and the rate of phase variation is proportional to the relative velocity of the system and the reflecting object. Thus in the instance of an airborne system, the total energy (sum of component energy vectors) vector from a particular patch of ground changes phase at a predetermined rate, said rate being proportional to the relative velocity between the aircraft and the patch of ground.

In normal radio object locating systems no means for detecting a phase change is provided, and ordinarily such change would not be manifested on the video indicator which is included in such systems. Actually, however, due to modulation caused by the finite beam width (to be more fully discussed hereinafter) changes in phase are indicated.

Systems which actually detected the phase change have been devised, one such system being fully discussed in a copending application of Robert H. Dicke, Serial No. 590,052, filed April 24, 1945, and issued December 26, 1950, as Patent No. 2,535,274. In this referred to application, the phase characteristics of echoes from objects having a velocity relative to the radio object locating system is fully described.

Consider the instance of a vehicle moving along the ground. As the vehicle has a velocity relative to the ground, an aircraft approaches the vehicle at a different rate than it approaches the patch of ground surrounding the vehicle. It is obvious that this is true unless the vehicle is moving at right angles to the line of travel of the aircraft (ground track). Thus, the total energy in the echo received at the aircraft may be considered to consist of two components, one being the energy from the patch of ground surrounding the vehicle, the other being that from the vehicle itself. Due to the relative velocity between the vehicle and the patch of ground, the vector representing the energy reflected from the vehicle has a phase which changes at a rate different from the vector representing the energy reflected from the patch of ground. It is evident that the resultant of the two vectors, each of which has a different angular velocity (rate of phase change) is a vector having a changing phase and a changing amplitude.

The above may be more fully understood by reference to Fig. 1 which is a diagrammatic representation of a pulse of radiant energy at various intervals of time, and where point "O" represents the position of the radio object locating system, or aircraft. Fig. 1a shows a patch of ground 2 which is energized by exploratory pulses of radiant energy, whereas, vehicle 4 is not energized thereby. The energy contained in an echo pulse returning from the patch of ground may be represented by a single energy vector 6. It is to be understood that, as in accordance with the foregoing description, this energy vector is the result of a number of component energy vectors.

Fig. 1b shows the same patch of ground shown in Fig. 1a but both vehicle 4 and the patch of ground are energized by the exploratory pulses. Thus, the total energy received at the aircraft may be considered to have two major components. One component, namely vector 6 (same as in Fig. 1a), represents the energy returned from the patch of ground 2, and a second component, namely vector 8, represents the energy returned by vehicle 4. The energy received at the radio object locating system is represented by resultant vector 10.

As relative phase only is of importance, vector 6 may be considered to the fixed, and vector 8 may be considered to revolve about it. It can be seen from Fig. 1b that the magnitude of vector 10 varies as the relative phase between vector 6 and vector 8 changes, and as vector 8 revolves about vector 6, the resultant vector 10 has a cyclical variation in amplitude. It is further evident that the frequency of amplitude variation of vector 10 is a function of the change of phase of vector 8 relative to the phase of vector 6. As the rate of phase change of vector 8 relative to the phase of vector 6 is dependent upon the relative velocity between vehicle 4 and patch of ground 6, it is also seen that the frequency of the amplitude variation of vector 10 may provide a measure of a component of the velocity of the vehicle.

Fig. 1c shows the same patch of ground 2 and same vehicle 4, however, said vehicle has now passed through the "energized" patch of ground and no longer provides a signal return. The echo-pulse at the radio object locating system, therefore, only includes energy from patch of ground 2 and may be represented by vector 6, said vector being the same as that shown in Fig. 1a.

Thus, in view of the above description, it can be seen that when a vehicle is included in a patch of ground energized by a beam of radiant energy, the echo-pulse received at the radio object locating system is amplitude modulated.

In the above discussion, it was assumed that the energy returning from the patch of ground and represented by vector 6 was constant in amplitude. If this is the actual case, in the absence of a vehicle in the energized patch of ground, the amplitude of the received echo-pulse is substantially constant. Due, however, to beam width modulation heretofore mentioned, the amplitude of vector 6 actually varies to a certain degree.

As the antenna beam has, generally speaking, a finite width, the aircraft approaches points on the ground energized by the beam at different rates. For example, consider two points of ground, each at a respective lateral extremity of the beam, then as the aircraft approaches one point at a different rate than it approaches the other point, the phase of the energy received from one extremity of the beam varies at a different rate than the energy received from the other extremity. As the resultant energy vector received at the aircraft is the sum of the component energy vectors from each point, it can be seen that the resultant energy vector varies in the amplitude (i. e., it is modulated).

The frequency of the amplitude variation is a maximum when the center line of the antenna beam is at right angles to the ground track of the aircraft, and is a minimum when coincident therewith. Ground track may be defined as an orthogonal projection on the ground of the actual forward line of travel of the aircraft. When the center line of the antenna beam is coincident with the ground track of the aircraft, the energy vector from the patch of ground is still amplitude modulated but only slightly so. Therefore for purposes of this discussion, it may be considered to have a substantially constant magnitude. A more complete discussion of beam width modulation is contained in a copending application of Rubby Sherr, Serial No. 624,907, entitled "Communication System," and filed October 20, 1945.

Figure 2:
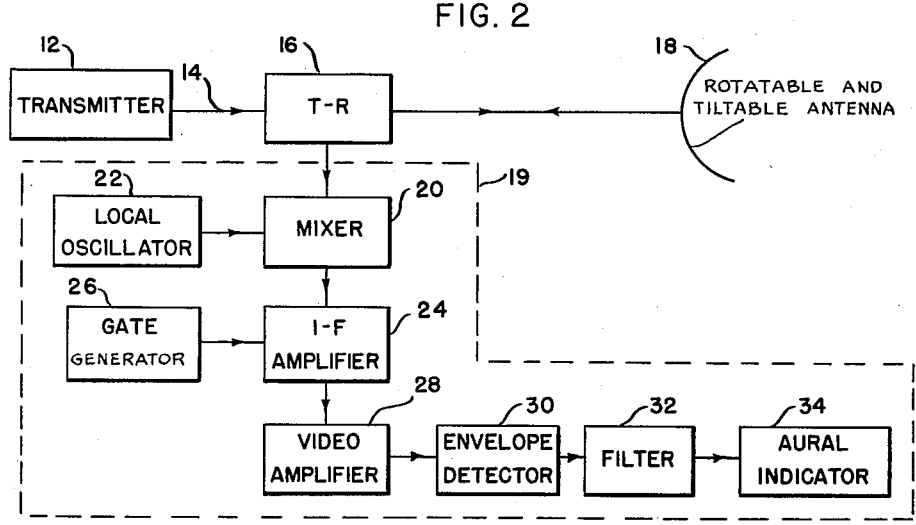
Fig. 2 is a schematic diagram in block form of one embodiment of the present invention.

Fig. 2 shows one embodiment of the present invention where an aural indication of moving objects is provided. In the figure, transmitter 12 provides short duration high carrier frequency exploratory pulses of radiant energy which are passed by transmission means 14 through transmit-receive switch 16 to directional antenna 18.

During the time when exploratory pulses are generated, transmit-receive switch 16 functions to connect transmitter 12 to directional antenna 18 and to disconnect receiver 19. During the interval between exploratory pulses and while echo-pulses are being received, these connections are reversed by transmit-receive switch 16, and directional antenna 18 is disconnected from transmitter 12 and connected to receiver 19.

For proper operation of the present invention, directional antenna 18 should be positioned so that the center line of the antenna beam is coincident with the ground track of the aircraft. The manner of accomplishing this will be more fully described hereinafter.

Echo-pulses received at directional antenna 18 are applied through transmit-receive switch 16 to mixer 20, a second input thereto comprising continuous wave oscillations from local oscillator 22. The beat frequency output from mixer 20, consisting of echo-pulses having an intermediate frequency carrier, is then applied to intermediate frequency amplifier 24. Instead of allowing receiver 19 to be sensitive to all signals received at directional antenna 18, receiver 19 may be adapted to pass only signals from predetermined ranges. This selection of signals may be accomplished by means of gate generator 26 which is associated with intermediate frequency amplifier 24.

Gate generator 26 provides a voltage for one of the receiver stages, in the instant case intermediate frequency amplifier 24, which serves to desensitize it at all times except for the time corresponding to the predetermined range. Assume by way of example that the elevation angle of the antenna (tilt) is adjusted so that the exploratory pulses energize an area immediately below the aircraft and a distance ahead for five miles (about). Then, instead of allowing the receiver to pass signals from ranges of zero to five miles, by means of gate generator 26, I.-F. amplifier 24 may be adapted to pass signals from a range of approximately three miles. The amplifier output from intermediate frequency amplifier 14 may be detected to provide video pulses and thence applied to video amplifier 28.

The video pulses issuing from video amplifier 28 are represented vectorially in Fig. 1. Said video pulses have two major energy components, one being that from a patch of ground and the other being that from a moving vehicle. The amplitude of the video pulse varies periodically when a moving vehicle is detected (as represented by vector 10, Fig. 1) and the amplitude remaining substantially constant in the instance of no moving vehicle being detected by the radio object locating system (vector 6, Figs. 1a and 1c).

The modulation envelope of the plurality of video pulses issuing from video amplifier 28 is obtained in envelope detector 30 and is applied through filter 32 to aural indicator 34. Filter 32 is adapted to pass the output from envelope detector 30 but to block the exploratory pulse repetition frequency from aural indicator 34. Filter 32 is also adapted to block any power supply ripple that might be prevalent in the system.

For normal aircraft and vehicle speeds, the frequency of the modulation envelope obtained by detector 30 is in the audio range. Aural indicator 34 therefore may consist of ear phones, or a loud speaker, or other similar device.

The above described system is operated as follows. For clarity of description assume first that no moving vehicle is detected by the system and hence the echo-pulses received represent energy reflected from patches of ground. The directional antenna 18 is rotated until the center line of the antenna beam is coincident with the ground track of the aircraft. In the absence of a moving vehicle, a note is heard in the ear phones due to the beam width modulation, and when the antenna is rotated so that the note is of a minimum pitch (frequency), the center line of the antenna beam is coincident with the ground track of the aircraft. Thus, when a moving vehicle is included in the patch of ground energized by the exploratory pulses, there will be superposed on the slow variation in the beam width modulation, an additional variation due to the phase shift of the echo from the moving object. A moving vehicle is therefore manifested in the ear phones by a definite note, the pitch of the note being proportional to a component of the velocity of the vehicle. The length of the time that the note is perceived in the ear phones is dependent upon the speed of the relative velocity between the aircraft and the vehicle. For typical vehicle speeds, the note lasts for one or two seconds.

In view of the foregoing description, it is evident as to why filter 32 should block the pulse repetition frequency, and the power supply ripple. Otherwise a background note would be continuously heard in aural indicator 34. This would make it difficult to detect the presence of moving vehicles and might cause the system to have a "blind spot," i. e., if a moving vehicle caused a modulation frequency equal to the pulse repetition or power supply ripple frequency.

While there has been described one embodiment of the present invention, it will be manifest to those skilled in the art that various changes and modifications may be made therein without departing from the invention and it is therefore determined in the appended claims, to cover all such changes and modifications as fall within the spirit and scope of the invention.

I claim:

1. In a system for detecting moving objects from an aircraft moving with respect to the ground including, means for generating short duration high carrier frequency exploratory pulses of radiant energy, means for radiating said exploratory pulses toward the ground in a directional beam, means for receiving echo-pulses of radiant energy from a given area of ground a predetermined distance from the aircraft, means for deriving voltage pulses from said echo pulses, said voltage pulses having an amplitude modulation due to the angular width of said directional beam, the maximum frequency of which is determined by the angle of said directional beam with respect to the ground, means for providing an aural indication of the frequency of said amplitude modulation, means for positioning the directional beam to obtain a minimum modulation frequency, said minimum modulation frequency being manifested by an aural note of minimum pitch, whereby the center line of the directional beam is substantially coincident with the ground track of the aircraft, the presence of moving objects within the area energized by said exploratory pulses being manifested by the occurrence of a note having a pitch other than said minimum pitch.

2. A system for detecting objects moving with respect to the ground from an aircraft moving with respect to the ground comprising, means on said aircraft for transmitting a single directional beam of short duration high carrier frequency exploratory pulses to illuminate a small area of ground, receiving means on said aircraft having a pass band about said carrier frequency for receiving energy reflected from said area of ground and from a moving object which may be located within said area of ground, reflected energy from said area of ground having a first frequency differing from said carrier frequency by an amount dependent upon the velocity of said aircraft with respect to the ground and reflected energy from said moving object having a second frequency differing from said carrier frequency by an amount dependent upon the velocity of said aircraft with respect to said moving object, whereby said second frequency differs from said first frequency by an amount dependent upon the velocity of said moving object with respect to the ground and said second frequency forms a single side band with respect to said first frequency, and means connected to said receiver which is responsive to the phase modulation of said first frequency reflected energy by said second frequency reflected energy for producing an output indicative of the presence of a moving object within said area of ground.

3. A system according to claim 2, wherein said last named means includes an aural indicator, whereby the presence of a moving object is manifasted by a momentary note of pitch having a frequency dependent upon the velocity of the moving object with respect to the ground.

4. A system according to claim 3, wherein the directional beam has a given angular width, whereby different portions of said area of ground have respectively different velocities with respect to said aircraft, thereby producing a steady note in said aural indicator, and further including means for positioning the directional beam to cause said steady note to have a minimum frequency, whereby the appearance of said momentary note is more easily discerned.

5. A system according to claim 4, further including means for rendering said receiving means operative only during the interval reflected energy from a predetermined range from said aircraft is arriving at said aircraft, whereby the effective angular width of said directional beam is decreased, thereby further reducing the frequency of said steady note.

RUBBY SHERR.

References Cited in the file of this patent

UNITED STATES PATENTS

| Number | Name | Date |
|---|---|---|
| 2,193,361 | Rice | Mar. 12, 1940 |
| 2,403,562 | Smith | July 9, 1946 |
| 2,410,424 | Brown | Nov. 5, 1946 |
| 2,455,639 | Anderson | Dec. 7, 1948 |
| 2,479,568 | Hansen | Aug. 23, 1949 |
| 2,491,542 | Woodyard et al. | Dec. 20, 1949 |
| 2,535,274 | Dicke | Dec. 26, 1950 |
| 2,558,758 | Jaynes | July 3, 1951 |

FOREIGN PATENTS

| Number | Country | Date |
|---|---|---|
| 113,233 | Austria | June 2, 1941 |